(12) United States Patent  
Fernandes

(10) Patent No.: US 8,693,795 B2  
(45) Date of Patent: Apr. 8, 2014

(54) LOW COMPLEXITY SECONDARY TRANSFORM FOR IMAGE AND VIDEO COMPRESSION

(75) Inventor: Felix Carlos Fernandes, Plano, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 236 days.

(21) Appl. No.: 13/242,981

(22) Filed: Sep. 23, 2011

(65) Prior Publication Data

US 2012/0082391 A1   Apr. 5, 2012

Related U.S. Application Data

(60) Provisional application No. 61/389,108, filed on Oct. 1, 2010.

(51) Int. Cl.
*G06K 9/36* (2006.01)
*G06K 9/46* (2006.01)

(52) U.S. Cl.
USPC .......................................... 382/248; 382/250

(58) Field of Classification Search
USPC ......... 382/154, 232, 233, 239, 248, 250, 251, 382/276, 284, 293, 294; 345/582, 634
See application file for complete search history.

(56) References Cited

U.S. PATENT DOCUMENTS

| | | | | | |
|---|---|---|---|---|---|
| 5,028,995 | A | * | 7/1991 | Izawa et al. | 375/240.12 |
| 5,487,172 | A | * | 1/1996 | Hyatt | 712/32 |
| 5,943,057 | A | * | 8/1999 | Ohba | 345/419 |
| 5,987,164 | A | * | 11/1999 | Szeliski et al. | 382/154 |
| 2012/0082391 | A1 | * | 4/2012 | Fernandes | 382/233 |

* cited by examiner

*Primary Examiner* — Amir Alavi

(57) ABSTRACT

A method for encoding video or images includes receiving input data associated with a block within a video or image frame and performing a transform of the input data to produce a first set of output coefficients. The method also includes receiving the first set of output coefficients and performing a second transform to produce a second set of output coefficients. The method further includes quantizing the second set of output coefficients. The second transform is performed using a rotational transform matrix that is selected to maximize a degree of orthogonality of the rotational transform matrix.

20 Claims, 1 Drawing Sheet

LOW COMPLEXITY SECONDARY TRANSFORM FOR IMAGE AND VIDEO COMPRESSION

CROSS-REFERENCE TO RELATED APPLICATION(S) AND CLAIM OF PRIORITY

The present application is related to U.S. Provisional Patent Application No. 61/389,108, filed Oct. 1, 2010, entitled "LOW COMPLEXITY SECONDARY TRANSFORM". Provisional Patent Application No. 61/389,108 is assigned to the assignee of the present application and is hereby incorporated by reference into the present application as if fully set forth herein. The present application hereby claims priority under 35 U.S.C. §119(e) to U.S. Provisional Patent Application No. 61/389,108.

TECHNICAL FIELD OF THE INVENTION

The present application relates generally to image and video encoding and, more specifically, to a low complexity secondary transform for use in image and video compression.

BACKGROUND OF THE INVENTION

In image and video encoders, image compression is used to reduce data throughput. In order to perform image compression, many image and video encoders encode an image by transforming an image of a pixel domain to coefficients of a frequency domain. A discrete cosine transform (DCT) is a well-known frequency transform technique that is widely used in image (and sound) compression. Transforms, such as DCT, may be used to improve the compression ratio, but transforms increase computational complexity. In recent years, much research has been performed to identify more efficient coding methods and transforms.

SUMMARY OF THE INVENTION

The present invention provides a method and apparatus for encoding and decoding an image.

The method for encoding video or images includes receiving, at a first transform circuit, input data associated with a block within a video or image frame and performing a transform of the input data to produce a first set of output coefficients. The method also includes receiving, at a secondary transform circuit, the first set of output coefficients and performing a second transform to produce a second set of output coefficients. The method further includes quantizing, at a quantization circuit, the second set of output coefficients. The second transform is performed using a rotational transform matrix that is selected to maximize a degree of orthogonality of the rotational transform matrix.

The apparatus includes a primary transform circuit configured to receive input data associated with a block within a video or image frame and perform a transform of the input data to produce a first set of output coefficients. The apparatus also includes a secondary transform circuit configured to receive the first set of output coefficients and perform a second transform to produce a second set of output coefficients. The apparatus further includes a quantization circuit configured to quantize the second set of output coefficients. The secondary transform circuit is configured to perform the second transform using a rotational transform matrix that is selected to maximize a degree of orthogonality of the rotational transform matrix A computer readable medium embodying a computer program is provided. The computer program includes instructions that when executed cause a processor to receive input data associated with a block within a video or image frame and perform a transform of the input data to produce a first set of output coefficients. The instructions also cause the processor to receive the first set of output coefficients and perform a second transform to produce a second set of output coefficients. The instructions further cause the processor to quantize the second set of output coefficients. The second transform is performed using a rotational transform matrix that is selected to maximize a degree of orthogonality of the rotational transform matrix.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawing, in which like reference numerals represent like parts.

DETAILED DESCRIPTION OF THE INVENTION

Figure 1:
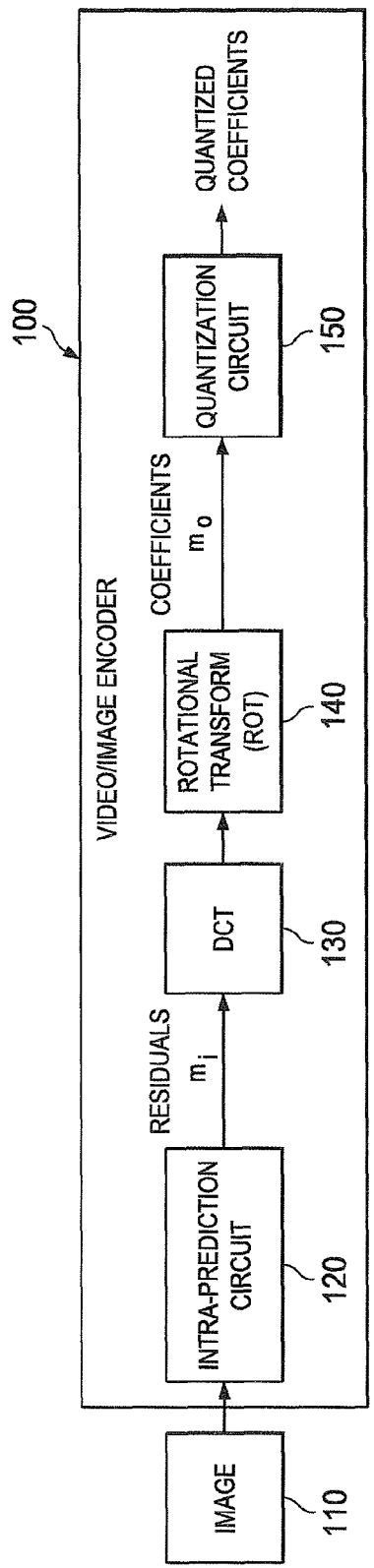
FIG. 1 illustrates a secondary rotational transform in a video or image encoder, according to an embodiment of this disclosure.
Figure 2:
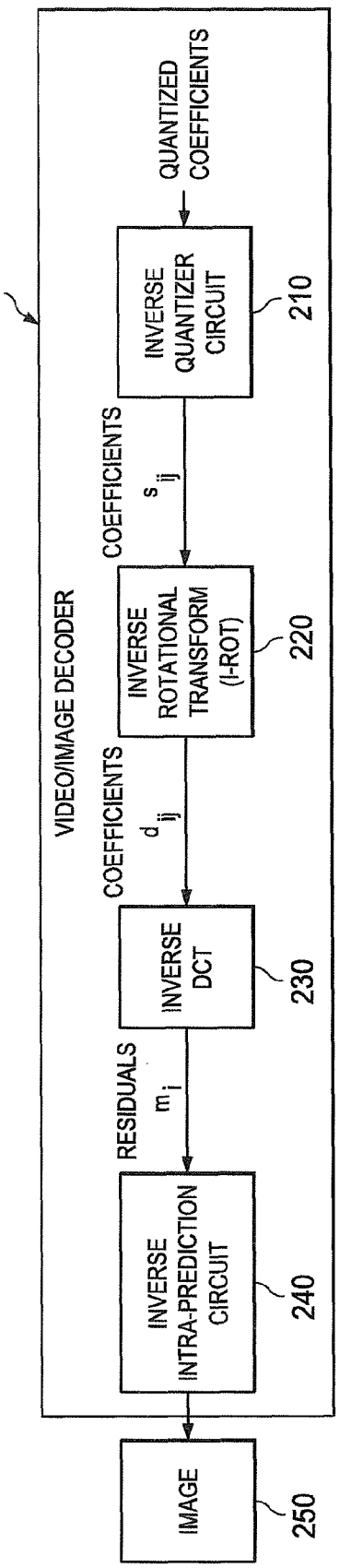
FIG. 2 illustrates a video or image decoder according to an embodiment of this disclosure.

FIGS. 1 and 2, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged video or image encoder.

The following documents and standards descriptions are hereby incorporated into the present disclosure as if fully set forth herein:

K. McCann, W.-J. Han and I.-K. Kim, "Samsung's Response to the Call for Proposals on Video Compression Technology", Joint Collaborative Team on Video Coding (JCT-VC) A124, April, 2010, Dresden, Germany (hereinafter "REF1");

T. D. Tran, "Fast, Multiplierless Approximation of the DCT", IEEE Signal Processing Letters, Vol. 7, pp. 141-144, 1999 (hereinafter "REF2");

Y.-J. Chen, S. Oraintara and T. D. Tran, "Multiplierless approximation of transforms with adder constraint", IEEE Signal Processing Letters, Vol. 9, pp. 344-347, November 2002 (hereinafter "REF3");

K. Komatsu and K. Sezaki, "Design of Lossless LOT and its performance evaluation", Proceedings of International Conference on Acoustics, Speech and Signal Processing, Vol. 4, pp. 2119-2122, Turkey, 2000 (hereinafter "REF4");

JCT-VC, "Test Model under Consideration", JCTVC-B205, Joint Collaborative Team on Video Coding meeting, July 2010, Geneva, Switzerland (hereinafter "REF5");

F. Bossen, "Common test conditions and software reference configurations", JCTVC-B300, July 2010, Geneva, Switzerland (hereinafter "REF6"); and Zhan Ma, Felix C. Fernandes, Elena Alshina, Alexander Alshin, "CE 7: Experimental Results for the Rotational Transform", JCTVC-F294, Joint Collaborative Team on Video Coding meeting, July 2011, Torino, Italy (hereinafter "REF7").

To effectively compress image or video frames, many encoders divide each frame into blocks and apply an orthogonal primary transform to each block within the frame. This process compacts the energy within each block into a few large transform coefficients and several small coefficients. The small coefficients are heavily quantized to achieve high compression ratios. To increase the compression ratio, an orthogonal secondary transform, such as a rotational transform, may be applied after the primary transform to improve quantization performance. This is described in greater detail in REF1. However, applying a secondary transform increases computational complexity. Therefore, a low-complexity, secondary transform that improves quantization performance is desirable.

Some attempts have been made to address the shortcomings of primary and secondary transforms. One approach uses lifting factorizations to reduce primary transform complexity, such as described in REF2. In this approach, lifting multipliers are approximated with rationals of the form $k/2^m$ to enable implementation with adders and shifters. The coding gain of the primary transform is maximized with a constraint on the lifting-factorization complexity. Although this technique works well for primary transforms such as the Discrete Cosine Transform (DCT), which are designed to have high coding gain, the technique is sub-optimal for orthogonal secondary transforms which are empirically designed to improve quantization performance, rather than maximize coding gain.

Another approach, described in REF3, minimizes coding gain and mean-square error between original and approximated transform outputs to obtain a low-complexity, primary transform. However, this technique does not explicitly consider the orthogonality of the primary transform, which is important for quantization performance, as explained below.

Some approaches that aim to design orthogonal, lossless, primary transforms, such as described in REF4, do not explicitly optimize transform orthogonality and hence quantization performance, as explained below. Instead, these techniques begin with a lapped orthogonal transform and then derive a lossless version that approximates the original and has high coding efficiency. Because Mean-Squared Error (MSE) is the metric for measuring approximation accuracy, the orthogonality is not explicitly optimized because the best MSE approximation is not necessarily the best orthogonal approximation.

Secondary transforms such as a rotational transform are designed specifically to improve quantization performance, which relies on a direct relationship between transform-domain quantization errors and reconstructed-image distortion. To equate these two quantities, thus obtaining the optimal direct relationship, transform-domain energy preservation is used. It is well known that orthogonality is a necessary and sufficient condition for transform-domain energy preservation. Therefore, the rotational transform has a parameterized structure that ensures orthogonality. The parameters are chosen empirically to maximize coding gain. However, the implementation of this secondary transform through matrix multiplication incurs high computational complexity. As described above, prior art methods do not consider transform orthogonality explicitly in complexity reduction because the associated techniques address primary transforms rather than secondary transforms.

To address the above-discussed deficiencies of the prior art, a low-complexity, almost-orthogonal, secondary transform is provided.

FIG. 1 illustrates a secondary rotational transform (ROT) in a video or image encoder, according to an embodiment of this disclosure. The ROT 140 shown in FIG. 1 is for illustration only. Other embodiments of ROT 140 may be used in the video/image encoder 100 of FIG. 1 or in any other suitable system without departing from the scope of this disclosure.

As shown in FIG. 1, video/image encoder 100 includes an intra-prediction circuit 120, a DCT 130, the ROT 140, and a quantization circuit 150. In one aspect of operation, image data 110 is transmitted to intra-prediction circuit 120. Intra-prediction circuit 120 divides image data 110 into a number of intra-predicted blocks. The size of each intra-predicted block may be, e.g., 8×8, 16×16, 32×32, or 64×64, and may vary from block to block.

DCT 130 receives residuals, identified as from intra-prediction circuit 120 and performs a primary transform. The transformed residuals are then received at ROT 140, which performs a secondary transform. The operation of ROT 140 is described in greater detail below. The coefficients from ROT 140, identified as $m_o$, are received at quantization circuit 150, which performs a quantization process. Thus, ROT 140 is used to improve quantization performance.

The operation of ROT 140 will now be described in greater detail. In an embodiment, the ROT-transformed coefficients $m_o$ are related to the input residuals $m_i$ from intra-prediction circuit 120 as follows:

$$m_o = R_v^T D^T m_i D R_h \quad \text{[Eqn. 1]}$$

where D, $R_h$ and $R_v$ are the DCT, horizontal ROT and vertical ROT matrices, respectively. DCT 130 performs the primary transform using the DCT matrix D, and ROT 140 performs the secondary transform using the horizontal ROT and vertical ROT matrices $R_h$ and $R_v$.

The matrices $R_h$ and $R_v$ are defined as the following compound Given's rotation matrix products:

$$R_v = R_z(\theta_1) R_x(\theta_2) R_z(\theta_3) \quad \text{[Eqn. 2]}$$

$$R_h = R_z(\theta_4) R_x(\theta_5) R_z(\theta_6) \quad \text{[Eqn. 3]}$$

where the matrices $R_x(\theta)$ and $R_z(\theta)$ are defined as follows:

$$R_x(\theta) = \begin{bmatrix} 1 & 0 & 0 & 0 & 0 & 0 & 0 & 0 \\ 0 & \cos(\theta) & -\sin(\theta) & 0 & 0 & 0 & 0 & 0 \\ 0 & \sin(\theta) & \cos(\theta) & 0 & 0 & 0 & 0 & 0 \\ 0 & 0 & 0 & 1 & 0 & 0 & 0 & 0 \\ 0 & 0 & 0 & 0 & \cos(\theta) & -\sin(\theta) & 0 & 0 \\ 0 & 0 & 0 & 0 & \sin(\theta) & \cos(\theta) & 0 & 0 \\ 0 & 0 & 0 & 0 & 0 & 0 & 1 & 0 \\ 0 & 0 & 0 & 0 & 0 & 0 & 0 & 1 \end{bmatrix} \quad \text{[Eqn. 4]}$$

$$R_z(\theta) = \begin{bmatrix} \cos(\theta) & -\sin(\theta) & 0 & 0 & 0 & 0 & 0 & 0 \\ \sin(\theta) & \cos(\theta) & 0 & 0 & 0 & 0 & 0 & 0 \\ 0 & 0 & 1 & 0 & 0 & 0 & 0 & 0 \\ 0 & 0 & 0 & \cos(\theta) & -\sin(\theta) & 0 & 0 & 0 \\ 0 & 0 & 0 & \sin(\theta) & \cos(\theta) & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix} \quad \text{[Eqn. 5]}$$

The matrices $R_x(\theta)$ and $R_z(\theta)$ are compound rotation matrices because they rotate simultaneously about two (2) pairs of axes in eight-dimensional space. By performing the rotations about predetermined angles, the rotational transform allows partial energy exchange between the columns and rows of a transform coefficient matrix. This energy re-distribution improves energy compaction and minimizes quantization error.

To increase coding gain, some embodiments implement more than a single matrix pair $R_h$ and $R_v$. In one such embodiment, four different, non-trivial, rotational transforms $R_h^i$ and $R_v^i$ are defined corresponding to four sets of rotation angles $\theta_1^i, \theta_2^i, \theta_3^i, \theta_4^i, \theta_5^i, \theta_6^i$, for $i = 1, \ldots, 4$. The values of the rotation angles for each index value i are shown below in Table 1.

TABLE 1

| $\theta_1$ | $\theta_2$ | $\theta_3$ | $\theta_4$ | $\theta_5$ | $\theta_6$ | |
|---|---|---|---|---|---|---|
| 0.439062 | 0.398875 | 5.964447 | 0.265359 | 0.098162 | 0.136199 | i = 1 |
| 6.022814 | 2.752694 | 5.742142 | 0.417013 | 0.232289 | 5.964058 | i = 2 |
| 0.155338 | 0.282589 | 0.173356 | 6.134357 | 3.028042 | 5.970585 | i = 3 |
| 0.574733 | 0.358758 | 0.261719 | 0.034780 | 3.036468 | 5.919162 | i = 4 |

An "identity" ROT may also be defined in which each rotation matrix is an identity matrix, so that the ROT is effectively skipped and no transform coefficients are changed after the DCT. The identity ROT may be identified using an index i=0. These five ROT transforms constitute a dictionary of alternative transforms. In an embodiment, one of the five transforms is selected at the encoder and transmitted to the decoder by encoding i=0, . . . , 4 for each transform unit.

To reduce the complexity of ROT 140, each Given's rotation matrix can be factorized as shown below:

$$R_x(\theta) = R_{xu}(\theta) R_{xv}(\theta) R_{xw}(\theta) \quad \text{[Eqn. 6]}$$

$$R_z(\theta) = R_{zu}(\theta) R_{zv}(\theta) R_{zw}(\theta) \quad \text{[Eqn. 7]}$$

where $R_{xu}(\theta)$, $R_{xv}(\theta)$, $R_{xw}(\theta)$, $R_{zu}(\theta)$, $R_{zv}(\theta)$, and $R_{zw}(\theta)$ are lifting matrices or "shears" and are defined as follows:

$$R_{xu}(\theta) = \begin{bmatrix} 1 & 0 & 0 & 0 & 0 & 0 & 0 & 0 \\ 0 & 1 & u & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & u & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix} \quad \text{[Eqn. 8]}$$

$$R_{xv}(\theta) = \begin{bmatrix} 1 & 0 & 0 & 0 & 0 & 0 & 0 & 0 \\ 0 & 1 & 0 & 0 & 0 & 0 & 0 & 0 \\ 0 & v & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & v & 1 & 0 & 0 \\ 0 & 0 & 0 & 0 & 0 & 0 & 1 & 0 \\ 0 & 0 & 0 & 0 & 0 & 0 & 0 & 1 \end{bmatrix} \quad \text{[Eqn. 9]}$$

$$R_{xw}(\theta) = \begin{bmatrix} 1 & 0 & 0 & 0 & 0 & 0 & 0 & 0 \\ 0 & 1 & w & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & w & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix} \quad \text{[Eqn. 10]}$$

$$R_{zu}(\theta) = \begin{bmatrix} 1 & u & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & u & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix} \quad \text{[Eqn. 11]}$$

$$R_{zv}(\theta) = \begin{bmatrix} 1 & 0 & 0 & 0 & 0 & 0 & 0 & 0 \\ v & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & v & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix} \quad \text{[Eqn. 12]}$$

$$R_{zw}(\theta) = \begin{bmatrix} 1 & w & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & w & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix} \quad \text{[Eqn. 13]}$$

where $u = w = -\tan\left(\frac{\theta}{2}\right)$ and $v = \sin(\theta)$.

In Equation 8 through Equation 13, it is noted that $u = w = -\tan(\theta/2)$. However, in some embodiments, better performance can be achieved by setting u and w to different approximations of $-\tan(\theta/2)$, so that u and w are distinct. To reduce complexity, the lifting multipliers u, v, w may approximated by rationals of the form $k/2^m$. With this particular approximation, each lifting multiplier is replaced by adders and shifters.

The metric for low complexity is now addressed in greater detail. In typical hardware implementations, multiplication of a variable x by a constant c is achieved with one or more adders and bit shifters. For example, to multiply x by c where c=50, the hardware considers the binary representation of c, which is '110010', and performs $$x*110010 = x*(2^5+2^4+2^1) = x<<5 + x<<4 + x<<1 \quad [\text{Eqn. 14}]$$

where << represents a left shift.

In example Equation 14, multiplication is obtained using two (2) elemental adders. When the binary representation of c has more than two (2) consecutive '1' bits, then subtraction can be used to reduce the number of elemental adders. For example, multiplication of x by c, where c=61 (with binary representation '111101') would require four (4) adders:

$$x*111101 = x<<5 + x<<4 + x<<3 + x<<2 + 1. \quad [\text{Eqn. 15}]$$

However, realizing that 111101=1000001−000100, this operation may be performed with only two (2) elemental adders:

$$x*111101 = x*(1000001-000100) = x<<6 - x<<2 + 1. \quad [\text{Eqn. 16}]$$

The preceding examples demonstrate that the number of elemental adders required for multiplication, $N_{adders}$, is given by $$N_{adders} = N_{isolated} + 2*N_{consecutive} - 1 \quad [\text{Eqn. 17}]$$

where $N_{isolated}$ is the number of isolated 1's in the binary representation and $N_{consecutive}$ is the number of groups of consecutive 1's. In practice, the product of x and c is often added to some other quantity in an algorithmic implementation. The following equation accounts for this extra addition:

$$N_{adders} = N_{isolated} + 2*N_{consecutive}. \quad [\text{Eqn. 18}]$$

To implement ROT 140 as a low-complexity, secondary transform that provides optimal quantization performance, it is advantageous to minimize $N_{adders}$, obtain a good approximation to an existing ROT, and maximize the degree of orthogonality. The maximization of orthogonality has not been specifically addressed in the prior art. However, this property is important for quantization performance, as explained previously.

Therefore, in accordance with this disclosure, the following optimization problem is solved to obtain the optimal, low-complexity secondary transform:

$$\{u, v, w\} = \underset{u,v,w}{\operatorname{argmin}} \begin{Bmatrix} N_{adders} + \\ \lambda_1 \|R_h(u, v, w) - R_h(\theta)\| + \\ \lambda_2 \|R_v(u, v, w) - R_v(\theta)\| + \\ \lambda_3 \|R_h(u, v, w) R_h^T(u, v, w) - I\| + \\ \lambda_4 \|R_v(u, v, w) R_v^T(u, v, w) - I\| \end{Bmatrix} \quad [\text{Eqn. 19}]$$

where $R_h(\theta)$ and $R_v(\theta)$ are existing horizontal and vertical ROTs, and $R_h(u,v,w)$ and $R_v(u,v,w)$ are horizontal and vertical ROT lifting parameterizations with free parameters in the vectors u, v, w. I represents the identity matrix. The coefficients $\lambda_1, \lambda_2, \lambda_3$, and $\lambda_4$ are weighting coefficients that may be selected to give more or less weight to each term in Equation 19. The values of $\lambda_1, \lambda_2, \lambda_3$, and $\lambda_4$ may be determined empirically, and may all be set equal to one (1) when the terms in Equation 19 are to be given equal weight.

Note that $N_{adders}$ is the number of elemental adders in the lifting multipliers u, V, w and is minimized to ensure low complexity. The second and third terms in the optimization, $\lambda_1 \|R_h(u,v,w) - R_h(\theta)\|$ and $\lambda_2 \|R_v(u,v,w) - R_v(\theta)\|$, are associated with accuracy of the horizontal transform and vertical transform, respectively. The second and third terms provide the fidelity criteria by determining $R_h(u,v,w)$ as close as possible to $R_h(\theta)$ and determining $R_v(u,v,w)$ as close as possible to $R_v(\theta)$. The fourth and fifth terms, $\lambda_3 \|R_h(u,v,w) R_h^T(u,v,w) - I\|$ and $\lambda_4 \|R_v(u,v,w) R_v^T(u,v,w) - I\|$, explicitly optimize orthogonality of the horizontal transform and vertical transform, respectively, and hence maximize quantization performance. The fourth and fifth terms have not been used explicitly in the prior art and thus, secondary ROT 140 represents an improvement over the prior art.

To illustrate the benefits of ROT 140, a comparison can be made between the complexity requirements of ROT 140 and the complexity requirements of the ROT described in REF5. The complexity requirements may be illustrated by the number of elemental adders required to perform each transform.

In one application using the ROT of REF5, it is observed that 334 elemental adders are required for the forward transform and 224 elemental adders are required for the inverse transform, based on a rotation about one pair of axes. Since compound rotations about two pairs of axes are needed, these counts are doubled. Hence, 668 elemental adders are needed for the forward ROT implementation of REF5, and 448 elemental adders are needed for the inverse ROT implementation of REF5.

In contrast, for the same application using ROT 140, it is observed that 178 elemental adders are required for the forward rotational transform about one pair of axes and 178 elemental adders are required for the inverse transform. Therefore, 356 elemental adders are required for a low-complexity forward ROT using ROT 140 and 356 elemental adders are required for a low-complexity inverse ROT using ROT 140. These findings are summarized in Table 2 below.

TABLE 2

| Transform Used | Adders for Forward Transform | Adders for Inverse Transform |
|---|---|---|
| ROT of REF5 | 668 | 448 |
| ROT 140 | 356 | 356 |

As shown in Table 1, use of ROT 140 reduces the elemental adder requirements for the forward transform by 46% and reduces the elemental adder requirements for the inverse transform by 21%, as compared to the ROT described in REF5. These findings are based on implementations of the ROT of REF5 and ROT 140 using a lifting factorization with twelve-bit (12-bit) precision. In other words, u, v, and w are approximated by rationals of the form $k/2^{12}$ or k/4096, where k is an integer. Furthermore, these reductions in complexity are realized without any compression-ratio reduction because the optimization in Equation 19 ensures that rotation-transform matrix orthogonality and, hence, quantization performance is maximized. In another embodiment, the complexity of each ROT may be reduced further by using five-bit (5-bit) precision instead of 12-bit precision (i.e., u, v, and w are approximated by rationals of the form $k/2^5$ or k/32).

The embodiment using five-bit precision is described here in detail for a decoder that reverses the encoding process of FIG. 1 and recovers the image from the quantized coefficients.

FIG. 2 illustrates such a decoder according to an embodiment of this disclosure. Decoder 200 includes an inverse quantizer circuit 210, an inverse ROT (I-ROT) 220, an inverse DCT 230, and an inverse intra-prediction circuit 240.

In one aspect of operation, inverse quantizer circuit 210 feeds an 8×8 array $s_{ij}$ of dequantized coefficients to I-ROT 220. I-ROT 220 recovers an 8×8 array $d_{ij}$ of primary transform coefficients that is input to inverse DCT 230. Inverse DCT 230 provides residuals $m_i$ to inverse intra-prediction circuit 240, which then recovers image 250. The operation of I-ROT 220 proceeds as follows:

For i=0 ... 7, a set of intermediate values $t_{ij}$ is derived by:

$g_3 = s_{i,3} - (u[idx][2]*s_{i,4}) >> 5$ $g_0 = s_{i,0} - (u[idx][2]*s_{i,1}) >> 5$ $f_4 = s_{i,4} - (v[idx][2]*g_3) >> 5$ $f_1 = s_{i,1} - (v[idx][2]*g_0) >> 5$ $c_3 = g_3 - (w[idx][2]*f_4) >> 5$ $c_0 = g_0 - (w[idx][2]*f_1) >> 5$ $d_4 = f_4 - (u[idx][1]*s_{i,5}]) >> 5$ $d_1 = f_1 - (u[idx][1]*s_{i,2}]) >> 5$ $t_{i,5} = s_{i,5} - (v[idx][1]*d_4) >> 5$ $t_{i,2} = s_{i,2} - (v[idx][1]*d_1) >> 5$ $b_4 = d_4 - (w[idx][1]*t_{i,5}) >> 5$ $b_1 = d_1 - (w[idx][1]*t_{i,2}) >> 5$ if(idx==1)

$e = b_1$ $b_1 = t_{i,2}$ $t_{i,2} = -e$ $e = b_4$ $b_4 = t_{i,5}$ $t_{i,5} = -e$ $a_3 = c_3 - (u[idx][0]*b_4) >> 5$ $a_0 = c_0 - (u[idx][0]*b_1) >> 5$ $t_{i,4} = b_4 - (v[idx][0]*a_3) >> 5$ $t_{i,1} = b_1 - (v[idx][0]*a_0) >> 5$ $t_{i,3} = a_3 - (w[idx][0]*t_{i,4}) >> 5$ $t_{i,0} = a_3 - (w[idx][0]*t_{i,1}) >> 5$ $t_{i,6} = s_{i,6}$ $t_{i,7} = s_{i,7}$ For j=0 ... 7, the transformed result $s_{ij}$ is computed from the intermediate values $t_{ij}$ as follows:

$g_3 = t_{3,j} - (u[idx][5]*t_{4,j}) >> 5$ $g_0 = t_{i,j} - (u[idx][5]*t_{1,j}) >> 5$ $f_4 = t_{4,j} - (v[idx][5]*g_3) >> 5$ $f_1 = t_{1,j} - (v[idx][5]*g_0) >> 5$ $c_3 = g_3 - (w[idx][5]*f_4) >> 5$ $c_0 = g_0 - (w[idx][5]*f_1) >> 5$ //$R_z$ $d_4 = f_4 - (u[idx][4]*t_{5,j}) >> 5$ $d_1 = f_1 - (u[idx][4]*t_{2,j}) >> 5$ $d_{5,j} = t_{5,j} - (v[idx][4]*d_4) >> 5$ $d_{2,j} = t_{2,j} - (v[idx][4]*d_1) >> 5$ $b_4 = d_4 - (W[idx][4]*d_{5,j}) >> 5$ $b_1 = d_1 - (W[idx][4]*d_{2,j}) >> 5$ //$R_z(\pi/2)$ swap and sign flip if((idx==2)||(idx==3))

$e = b_1$ $b_1 = d_{2,j}$ $d_{2,j} = -e$ $e = b_4$ $b_4 = d_{5,j}$ $d_{5,j} = -e$

//$R_x$ $a_3 = c_3 - (u[idx][3]*b_4) >> 5$ $a_0 = c_0 - (u[idx][3]*b_1) >> 5$ $d_{4,j} = b_4 - (v[idx][3]*a_3) >> 5$ $d_{1,j} = b_1 - (v[idx][3]*a_0) >> 5$ $d_{3,j} = a_3 - (w[idx][3]*d_{4,j}) >> 5$ $d_{0,j} = a_0 - (w[idx][3]*d_{1,j}) >> 5$ $d_{6,j} = t_{6,j}$ $d_{7,j} = t_{7,j}$ In the multiplier matrices, values for parameters u, v, and w are specified in Tables 3, 4 and 5 below, where each parameter's first dimension value idx is associated with the rows in Tables 3, 4, and 5, and each parameter's second dimension values 0 through 5 are associated with the columns in Tables 3, 4, and 5.

TABLE 3

| | u Lifting Multipliers | | | | | |
|---|---|---|---|---|---|---|
| | 0 | 1 | 2 | 3 | 4 | 5 |
| idx = 1 | −7 | −7 | 5 | −4 | −2 | −2 |
| idx = 2 | 4 | −22 | 9 | −7 | −4 | 5 |
| idx = 3 | −3 | −5 | −3 | 2 | −29 | 5 |
| idx = 4 | −10 | −6 | −4 | −1 | −29 | 6 |

TABLE 4 v Lifting Multipliers

|  | 0 | 1 | 2 | 3 | 4 | 5 |
|---|---|---|---|---|---|---|
| idx = 1 | 14 | 13 | −10 | 8 | 3 | 4 |
| idx = 2 | −8 | 30 | −17 | 13 | 7 | −10 |
| idx = 3 | 5 | 9 | 6 | −5 | 32 | −10 |
| idx = 4 | 18 | 11 | 8 | 1 | 32 | −12 |

TABLE 5 w Lifting Multipliers

|  | 0 | 1 | 2 | 3 | 4 | 5 |
|---|---|---|---|---|---|---|
| idx = 1 | −7 | −7 | 5 | −4 | −1 | −2 |
| idx = 2 | 4 | −22 | 9 | −7 | −4 | 5 |
| idx = 3 | −3 | −5 | −3 | 2 | −29 | 5 |
| idx = 4 | −10 | −6 | −4 | −1 | −29 | 6 |

It is observed that Table 3 and Table 5 are identical except for the entry in Row 1, Column 4. In another embodiment, to avoid storing and implementing Table 5, the entry in Row 1, Column 4 is set to −2 so that Table 5 is identical to Table 3. In this case, all w lifting multipliers are identical to the corresponding u lifting multipliers.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for encoding video or images, the method comprising:
    receiving, at a first transform circuit, input data associated with a block within a video or image frame and performing a transform of the input data to produce a first set of output coefficients;
    receiving, at a secondary transform circuit, the first set of output coefficients and performing a second transform to produce a second set of output coefficients; and
    quantizing, at a quantization circuit, the second set of output coefficients,
    wherein the second transform is performed using a rotational transform matrix that is factorized into lifting steps with multipliers that are selected to maximize a degree of orthogonality of the rotational transform matrix.

2. The method of claim 1, wherein the rotational transform matrix is further selected to minimize a number of elemental adders required to perform at least one matrix multiplication associated with the rotational transform matrix.

3. The method of claim 2, wherein parameters u, v, and w associated with the rotational matrix are determined based upon the following optimization equation:

$$\{u, v, w\} = \underset{u,v,w}{\operatorname{argmin}} \begin{Bmatrix} N_{adders} + \\ \lambda_1 \|R_h(u, v, w) - R_h(\theta)\| + \\ \lambda_2 \|R_v(u, v, w) - R_v(\theta)\| + \\ \lambda_3 \|R_h(u, v, w)R_h^T(u, v, w) - I\| + \\ \lambda_4 \|R_v(u, v, w)R_v^T(u, v, w) - I\| \end{Bmatrix}$$

where $R_h(\theta)$ and $R_v(\theta)$ are predetermined horizontal and vertical rotational transforms (ROTs) $R_h(u,v,w)$ and $R_v(u,v,w)$ are horizontal and vertical ROT lifting matrices, $N_{adders}$ is a number of elemental adders associated with $R_h(u,v,w)$ and $R_v(u,v,w)$, I is an identity matrix, and $\lambda_1$, $\lambda_2$, $\lambda_3$, and $\lambda_4$ are weighting coefficients.

4. The method of claim 3, wherein the parameters u, v, and w are of the form $k/2^m$ where k and m are integers.

5. The method of claim 3, wherein the parameters u, v, and w are selected from values in the following tables:

u values

|  | 0 | 1 | 2 | 3 | 4 | 5 |
|---|---|---|---|---|---|---|
| idx = 1 | −7 | −7 | 5 | −4 | −2 | −2 |
| idx = 2 | 4 | −22 | 9 | −7 | −4 | 5 |
| idx = 3 | −3 | −5 | −3 | 2 | −29 | 5 |
| idx = 4 | −10 | −6 | −4 | −1 | −29 | 6 | v values

|  | 0 | 1 | 2 | 3 | 4 | 5 |
|---|---|---|---|---|---|---|
| idx = 1 | 14 | 13 | −10 | 8 | 3 | 4 |
| idx = 2 | −8 | 30 | −17 | 13 | 7 | −10 |
| idx = 3 | 5 | 9 | 6 | −5 | 32 | −10 |
| idx = 4 | 18 | 11 | 8 | 1 | 32 | −12 | w values

|  | 0 | 1 | 2 | 3 | 4 | 5 |
|---|---|---|---|---|---|---|
| idx = 1 | −7 | −7 | 5 | −4 | −1 | −2 |
| idx = 2 | 4 | −22 | 9 | −7 | −4 | 5 |
| idx = 3 | −3 | −5 | −3 | 2 | −29 | 5 |
| idx = 4 | −10 | −6 | −4 | −1 | −29 | 6. |

6. The method of claim 3, wherein values for the parameter w are identical to corresponding values for the parameter u and the parameters u, v, and w are selected from values in the following tables:

u, w values

|  | 0 | 1 | 2 | 3 | 4 | 5 |
|---|---|---|---|---|---|---|
| idx = 1 | −7 | −7 | 5 | −4 | −2 | −2 |
| idx = 2 | 4 | −22 | 9 | −7 | −4 | 5 |
| idx = 3 | −3 | −5 | −3 | 2 | −29 | 5 |
| idx = 4 | −10 | −6 | −4 | −1 | −29 | 6 | v values

|  | 0 | 1 | 2 | 3 | 4 | 5 |
|---|---|---|---|---|---|---|
| idx = 1 | 14 | 13 | −10 | 8 | 3 | 4 |
| idx = 2 | −8 | 30 | −17 | 13 | 7 | −10 |
| idx = 3 | 5 | 9 | 6 | −5 | 32 | −10 |
| idx = 4 | 18 | 11 | 8 | 1 | 32 | −12. |

7. The method of claim 1, wherein the video or image frame is configured to be recovered by a decoder using a decoding process that is substantially reverse of the encoding process.

8. An apparatus configured to encode video or images, the apparatus comprising:
 a primary transform circuit configured to receive input data associated with a block within a video or image frame and perform a transform of the input data to produce a first set of output coefficients;
 a secondary transform circuit configured to receive the first set of output coefficients and perform a second transform to produce a second set of output coefficients; and
 a quantization circuit configured to quantize the second set of output coefficients,
 wherein the secondary transform circuit is configured to perform the second transform using a rotational transform matrix that is factorized into lifting steps with multipliers that are selected to maximize a degree of orthogonality of the rotational transform matrix.

9. The apparatus of claim 8, wherein the rotational transform matrix is further selected to minimize a number of elemental adders required to perform at least one matrix multiplication associated with the rotational transform matrix.

10. The apparatus of claim 9, wherein parameters u, v, and w associated with the rotational matrix are determined based upon the following optimization equation:

$$\{u, v, w\} = \underset{u,v,w}{\mathrm{argmin}} \left\{ \begin{array}{l} N_{adders} + \\ \lambda_1 \|R_h(u, v, w) - R_h(\theta)\| + \\ \lambda_2 \|R_v(u, v, w) - R_v(\theta)\| + \\ \lambda_3 \|R_h(u, v, w)R_h^T(u, v, w) - I\| + \\ \lambda_4 \|R_v(u, v, w)R_v^T(u, v, w) - I\| \end{array} \right\}$$

where $R_h(\theta)$ and $R_v(\theta)$ are predetermined horizontal and vertical rotational transforms (ROTs) $R_h(u,v,w)$ and $R_v(u,v,w)$ are horizontal and vertical ROT lifting matrices, $N_{adders}$ is a number of elemental adders associated with $R_h(u,v,w)$ and $R_v(u,v,w)$, I is an identity matrix, and $\lambda_1$, $\lambda_2$, $\lambda_3$, and $\lambda_4$ are weighting coefficients.

11. The apparatus of claim 10, wherein the parameters u, v, and w are of the form $k/2^m$ where k and m are integers.

12. The apparatus of claim 10, wherein the parameters u, v, and w are selected from values in the following tables:

| u values | 0 | 1 | 2 | 3 | 4 | 5 |
|---|---|---|---|---|---|---|
| idx = 1 | −7 | −7 | 5 | −4 | −2 | −2 |
| idx = 2 | 4 | −22 | 9 | −7 | −4 | 5 |
| idx = 3 | −3 | −5 | −3 | 2 | −29 | 5 |
| idx = 4 | −10 | −6 | −4 | −1 | −29 | 6 |

| v values | 0 | 1 | 2 | 3 | 4 | 5 |
|---|---|---|---|---|---|---|
| idx = 1 | 14 | 13 | −10 | 8 | 3 | 4 |
| idx = 2 | −8 | 30 | −17 | 13 | 7 | −10 |
| idx = 3 | 5 | 9 | 6 | −5 | 32 | −10 |
| idx = 4 | 18 | 11 | 8 | 1 | 32 | −12 |

| w values | 0 | 1 | 2 | 3 | 4 | 5 |
|---|---|---|---|---|---|---|
| idx = 1 | −7 | −7 | 5 | −4 | −1 | −2 |
| idx = 2 | 4 | −22 | 9 | −7 | −4 | 5 |
| idx = 3 | −3 | −5 | −3 | 2 | −29 | 5 |
| idx = 4 | −10 | −6 | −4 | −1 | −29 | 6. |

13. The apparatus of claim 10, wherein values for the parameter w are identical to corresponding values for the parameter u and the parameters u, v, and w are selected from values in the following tables:

| u, w values | 0 | 1 | 2 | 3 | 4 | 5 |
|---|---|---|---|---|---|---|
| idx = 1 | −7 | −7 | 5 | −4 | −2 | −2 |
| idx = 2 | 4 | −22 | 9 | −7 | −4 | 5 |
| idx = 3 | −3 | −5 | −3 | 2 | −29 | 5 |
| idx = 4 | −10 | −6 | −4 | −1 | −29 | 6 |

| v values | 0 | 1 | 2 | 3 | 4 | 5 |
|---|---|---|---|---|---|---|
| idx = 1 | 14 | 13 | −10 | 8 | 3 | 4 |
| idx = 2 | −8 | 30 | −17 | 13 | 7 | −10 |
| idx = 3 | 5 | 9 | 6 | −5 | 32 | −10 |
| idx = 4 | 18 | 11 | 8 | 1 | 32 | −12. |

14. The apparatus of claim 8, wherein the video or image frame is configured to be recovered by a decoder using a decoding process that is substantially reverse of the encoding process.

15. A non-transitory computer readable medium encoded with executable instructions that when executed cause one or more processors to:
 receive input data associated with a block within a video or image frame and perform a transform of the input data to produce a first set of output coefficients;
 receive the first set of output coefficients and perform a second transform to produce a second set of output coefficients; and
 quantize the second set of output coefficients,
 wherein the second transform is performed using a rotational transform matrix that is factorized into lifting steps with multipliers that are selected to maximize a degree of orthogonality of the rotational transform matrix.

16. The non-transitory computer readable medium of claim 15, wherein the rotational transform matrix is further selected to minimize a number of elemental adders required to perform at least one matrix multiplication associated with the rotational transform matrix.

17. The non-transitory computer readable medium of claim 16, wherein parameters u, v, and w associated with the rotational matrix are determined based upon the following optimization equation:

$$\{u, v, w\} = \underset{u,v,w}{\operatorname{argmin}} \begin{Bmatrix} N_{adders} + \\ \lambda_1 \|R_h(u, v, w) - R_h(\theta)\| + \\ \lambda_2 \|R_v(u, v, w) - R_v(\theta)\| + \\ \lambda_3 \|R_h(u, v, w)R_h^T(u, v, w) - I\| + \\ \lambda_4 \|R_v(u, v, w)R_v^T(u, v, w) - I\| \end{Bmatrix}$$

where $R_h(\theta)$ and $R_v(\theta)$ are predetermined horizontal and vertical rotational transforms (ROTs), $R_h(u,v,w)$ and $R_v(u,v,w)$ are horizontal and vertical ROT lifting matrices, $N_{adders}$ is a number of elemental adders associated with $R_h(u,v,w)$ and $R_v(u,v,w)$, I is an identity matrix, and $\lambda_1$, $\lambda_2$, $\lambda_3$, and $\lambda_4$ are weighting coefficients.

18. The non-transitory computer readable medium of claim 17, wherein the parameters u, v, and w are of the form $k/2^m$ where k and m are integers.

19. The non-transitory computer readable medium of claim 17, wherein the parameters u, v, and w are selected from values in the following tables:

| u values | | | | | | |
|---|---|---|---|---|---|---|
| | 0 | 1 | 2 | 3 | 4 | 5 |
| idx = 1 | −7 | −7 | 5 | −4 | −2 | −2 |
| idx = 2 | 4 | −22 | 9 | −7 | −4 | 5 |
| idx = 3 | −3 | −5 | −3 | 2 | −29 | 5 |
| idx = 4 | −10 | −6 | −4 | −1 | −29 | 6 |

| v values | | | | | | |
|---|---|---|---|---|---|---|
| | 0 | 1 | 2 | 3 | 4 | 5 |
| idx = 1 | 14 | 13 | −10 | 8 | 3 | 4 |
| idx = 2 | −8 | 30 | −17 | 13 | 7 | −10 |
| idx = 3 | 5 | 9 | 6 | −5 | 32 | −10 |
| idx = 4 | 18 | 11 | 8 | 1 | 32 | −12 |

| w values | | | | | | |
|---|---|---|---|---|---|---|
| | 0 | 1 | 2 | 3 | 4 | 5 |
| idx = 1 | −7 | −7 | 5 | −4 | −1 | −2 |
| idx = 2 | 4 | −22 | 9 | −7 | −4 | 5 |
| idx = 3 | −3 | −5 | −3 | 2 | −29 | 5 |
| idx = 4 | −10 | −6 | −4 | −1 | −29 | 6. |

20. The non-transitory computer readable medium of claim 17, wherein values for the parameter w are identical to corresponding values for the parameter u and the parameters u, v, and w are selected from values in the following tables:

| u, w values | | | | | | |
|---|---|---|---|---|---|---|
| | 0 | 1 | 2 | 3 | 4 | 5 |
| idx = 1 | −7 | −7 | 5 | −4 | −2 | −2 |
| idx = 2 | 4 | −22 | 9 | −7 | −4 | 5 |
| idx = 3 | −3 | −5 | −3 | 2 | −29 | 5 |
| idx = 4 | −10 | −6 | −4 | −1 | −29 | 6 |

| v values | | | | | | |
|---|---|---|---|---|---|---|
| | 0 | 1 | 2 | 3 | 4 | 5 |
| idx = 1 | 14 | 13 | −10 | 8 | 3 | 4 |
| idx = 2 | −8 | 30 | −17 | 13 | 7 | −10 |
| idx = 3 | 5 | 9 | 6 | −5 | 32 | −10 |
| idx = 4 | 18 | 11 | 8 | 1 | 32 | −12. |

* * * * *